United States Patent [19]
Carnahan et al.

[11] 3,754,870
[45] Aug. 28, 1973

[54] METHOD AND MEANS OF CATALYTICALLY CONVERTING FLUIDS

[75] Inventors: Robert D. Carnahan, Barrington; Karl J. Youtsey, Chicago, both of Ill.

[73] Assignee: Universal Oil Products Company, Des Plaines, Ill.

[22] Filed: Aug. 26, 1971

[21] Appl. No.: 175,237

[52] U.S. Cl. ............... 23/288 F, 423/213, 423/214
[51] Int. Cl. ........................... F01n 3/14, B01j 9/04
[58] Field of Search .................. 23/288 F; 252/477; 423/213, 214; 60/299

[56] References Cited
UNITED STATES PATENTS

| | | | |
|---|---|---|---|
| 3,018,841 | 1/1962 | Gerlich | 23/288 F UX |
| 3,189,418 | 6/1965 | Gary | 23/288 F |
| 3,208,131 | 9/1965 | Ruff et al. | 23/288 F UX |
| 3,211,534 | 10/1965 | Ridgway | 23/288 F X |
| 3,441,381 | 4/1969 | Keith et al. | 23/288 F |
| 3,441,382 | 4/1969 | Keith et al. | 23/288 F |
| 3,476,524 | 11/1969 | Burke | 23/288 F |
| 3,489,809 | 1/1970 | Keith et al. | 252/477 R X |
| 3,597,165 | 8/1971 | Keith et al. | 23/288 F |

*Primary Examiner*—Barry S. Richman
*Attorney*—James R. Hoatson, Jr. et al.

[57] ABSTRACT

Method and means of catalytically converting fluids such as exhaust gases. The fluid is first passed through a skeletal material zone having a plurality of flow paths in the direction of flow. The skeletal material zone is preferably made catalytically active. Immediately after withdrawing the fluid from the skeletal material zone, the fluid is passed through subdivided catalyst material. These steps may be repeated more than once prior to final withdrawal.

4 Claims, 3 Drawing Figures

PATENTED AUG 28 1973  3,754,870

INVENTORS:
ROBERT D. CARNAHAN
KARL J. YOUTSEY
BY: James R. Hoatson, Jr.
Ronald H. Hausch
ATTORNEYS

METHOD AND MEANS OF CATALYTICALLY CONVERTING FLUIDS

The present invention is directed to the method and means of catalytically converting a fluid. More particularly, it is directed to methods and means of converting a fluid such as exhaust gases by passing such fluid alternately first through a skeletal material zone having a plurality of flow paths in the direction of flow and secondly through subdivided catalyst material.

The use of catalysts in catalytically active zones to promote chemical reactions has received extensive attention in commercial processes and in the control of air pollution. For many years considerable research has been devoted to the discovery and improvement of catalytic materials which will accelerate desired chemical conversions with the idea that for most reactions there is some material or composition of material which will catalyze and promote the reactions more efficiently and economically than known methods of catalysis. Concurrent with the increasing use of catalysts has been the development of catalytic apparatus. Numerous types of such apparatus and methods of employing catalytic materials have been proposed. Thus, catalytic materials have been prepared as gels, powders, pellets, and other forms and have been arranged in solid beds, layers, spaced beds, tubes, suspensions, and other manners. Such forms and manners of arrangement have been more or less satisfactory, the particular form and arrangement depending to some extent upon the particular catalytic material being used and the operation in which it is being used, but more efficient ways are constantly being sought.

In recent years, the desirability of removing or converting noxious compounds of exhaust gases from automobiles, trucks, etc. has been generally well established. The unavoidable incomplete combustion of hydrocarbon fuel via a gasoline or diesel engine results in a generation of substantial quantities of unburned hydrocarbons, oxides of nitrogen, and other undesirable products, which as waste products discharge into the atmosphere through the exhaust line. With the ever-increasing concentration of automobiles, particularly in urban areas, the resulting accumulation of these undesirable products in the atmosphere may reach high proportions. These combustion products are known to react with atmospheric gases to produce smog or pollution. Such waste products include, for example, saturated and unsaturated hydrocarbons, carbon monoxide, aromatics, partially oxygenated hydrocarbons, such as aldehydes, ketones, alcohols, and acids as well as oxides of nitrogen and sulfur. In a catalytic operation, hot gases issuing from the engine exhaust manifold are passed through a catalytic zone maintained within a converter, so as to affect a more or less complete conversion of the waste products in the exhaust to a harmless state.

One of the problems of past systems has been the inability to provide immediate conversion on start up of the engine, when the choke is almost entirely closed to provide a rich mixture to the engine. Prior art schemes included utilizing subdivided catalyst materials such as alumina spheres impregnated with platinum or other metals or other oxides. These particles were maintained in a compartment supported in a housing. The compartment comprised generally screening or metallic perforate partitions which held the catalyst in position. Although the existing catalyst was active enough to sustain substantial conversion once the reactor was warmed sufficiently, it has been found that initial conversion was very slow at engine start up. We have found that the screening supporting the catalyst and allowing gas flow therethrough had a detrimental effect on initial conversion. That is the screening either conducted away or retained much of the initial heat from the exhaust gases and thus prevented early or initial catalytic activity of the subdivided material.

Other prior art schemes included utilizing skeletal structures having flow paths extending through the material in the direction of flow, commonly known as honeycomb material impregnated with a metal or metal oxide catalyst such as platinum and the like. It has been found that although such material has many good qualities such as low pressure drop and structural stability its relatively good catalyst activity generally does not compare to the activity of subdivided material. We have found this to be true especially in the downstream areas of the honeycomb material where a relatively stable laminar flow boundary layer has developed.

SUMMARY OF THE INVENTION

It is thus a principal object of the present invention to provide for the method and means for catalytically converting fluids such as exhaust gases.

It may also be considered an object of this invention to provide for the method and means of converting exhaust gases of an internal combustion engine wherein initial conversion is substantially high.

Thus, in one of its broadest aspects the present invention provides for a catalytic converter for converting fluids comprising in combination: (a) an outer housing; (b) inlet means connected to said housing for introducing said fluid therein; (c) output means connected to said housing for withdrawing converted fluid therefrom; (d) a catalyst retaining section supported in said housing having a perforate inlet side communicating with said inlet means and a perforate outlet side communicating with said outlet means; (e) said inlet side being comprised of a skeletal structure having a plurality of flow paths extending therethrough in the direction of flow; and, (f) subdivided catalyst contained within said retaining section.

In its broad sense, the skeletal structure may be catalytically inactive. Because the material best suitable for making the skeletal structure has low heat conductivity and low heat retention characteristics, compared with steel screening, the light off time for the catalyst material in the retaining section is fairly fast. Preferably, however, the skeletal structure is made catalytically active. The outlet side of the converter may also be made of the catalytically active skeletal structure having a plurality of flow paths extending through the material in a direction of flow. It is also within the scope of this invention to provide for a plurality of catalyst sections each spaced by a common perforate side of skeletal structure having a plurality of flow paths extending therethrough in the direction of flow. In a preferred embodiment, barrier means is provided upstream of the inlet perforate side of the catalyst retaining section for preventing fluid flow through the perimeter openings of the structure. Thus, in effect, there is an insulating portion around the periphery of the skeletal structure to prevent loss of heat through the sides of the housing.

In another aspect the present invention provides for a method of catalytically converting fluids comprising the steps of: (a) passing said fluid through a first catalytically active skeletal material zone having a plurality of flow paths in the direction of flow; (b) immediately after withdrawing said fluid from said skeletal material zone; passing said fluid through a first catalytically active subdivided material zone; and, (c) withdrawing said fluid from said final zone.

Another embodiment is to provide a second catalytically active skeletal material zone downstream of the subdivided material zone to provide further conversion. Furthermore, steps (a) and (b) may be repeated prior to the final withdrawal step. Reference to the accompanying drawing and the following description thereof will serve to more fully illustrate the present invention as well as to set forth additional advantageous features in connection therewith.

DESCRIPTION OF THE DRAWING

Referring now to FIG. 1 of the drawing there is shown an elevational view of a catalytic reactor or converter which may be used for the conversion of exhaust gases. Converter 1 is comprised of an outer housing 2 having a central tubular portion 3 and two end closure sections 4 and 5. Becuase of ease in fabrication, the preferred cross-section of the housing 2 is circular; however, this should not be limiting upon the present invention. Other shapes are contemplated such as rectangular, oval, and the like. Reactor 1 is further comprised of an inlet 6 and an outlet 7 for introducing and discharging the gases therein. Of course both inlet and outlet means communicate through the housing 2 into the interior thereof. End closure means 4 and 5 have inwardly facing flanged end sections 8 and 9 respectively which are used to support the catalyst retaining section 17. Openings 10 and 11 are provided in end closure means 4 and 5 respectively. The catalyst retaining section 17 is comprised of two perforate side members 12 and 14 respectively which communicate with the inlet and outlet means respectively. The inlet side 12 is comprised of a skeletal structure having a plurality of flow paths extending therethrough and in the direction of flow. The outlet side may be screening or perforate plate supported by the flanged portion 9 of end closure means 5. To maintain spacing between the two side members a ceramic ring 13 is provided although other means of support is contemplated. The ceramic ring 13 in effect has the additional advantage of providing insulation to protect the outer housing from extreme heat generated in catalyst retaining section 17. On the other hand, side members 12 and 14 may be supported by a channel or by a pair of angles or the like.

Figure 3:
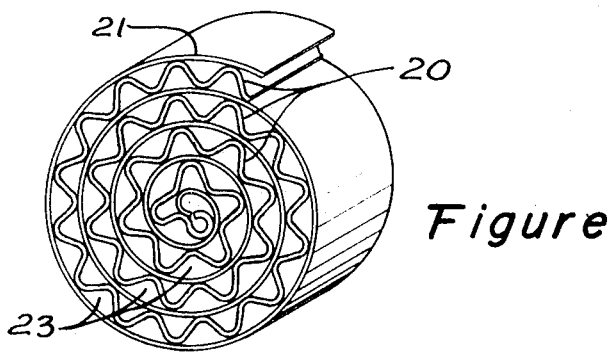
FIG. 3 of the drawing is a pictorial view of a honeycomb structure utilized in connection with this invention.

The skeletal structure 12, which is sometimes referred to as honeycomb material, is well known to those skilled in the art. There are various kinds on the market and major U.S. manufacturers include American Lava Corporation, a subsidiary of 3M Corporation, E. I. DuPont, Inc., and Corning Glass Company. Honeycomb or skeletal material as used herein in general refers to a unitary inert refractory skeletal structure which is characterized by having a large plurality of gas flow paths extending through the material in the direction of fluid flow. The openings may be substantially parallel and extend through the support from one side to the opposite, with such openings being separated from one another by preferably thin walls defining openings. Reference should be made to FIG. 3 of the drawing for one example of such a structure where it is seen that the honeycomb is comprised of a layer of corrugated film 20 and a sheet member 21 which have been rolled in the form of a helix and adhere together to form the honeycomb material. The result is that a plurality of unobstructed flow paths 23 are formed. Reference should be made to Johnson U.S. Pat. No. 3,444,925 for a more complete description of the method of making this particular honeycomb configuration. Alternatively, a network of flow paths may permeate the structure so as to form a tortuous flow path such as a cross flow grade of honeycomb materials sold under the registered trademark of Torvex manufactured by DuPont Corp. The particular honeycomb structure shown in FIG. 3 is an American Lava configuration and is sold under the trade name of Therma-Comb.

Typically, the path openings of honeycomb material are distributed across the entire face of the material and are subject to initial contact with the gas or fluid to be reacted. The paths can be of any shape and size consistent with the desired superficial surface area. Cross-sectional area or shape of the paths can be, for example a trapezoid, rectangle, square, sinewave, circle, and any other cross-section that shows repeating patterns that can be described as a honeycomb, corrugated, or lattice material, since it is not the intent of this invention to limit the shape and size.

Likewise, it is not intended to limit the honeycomb material to any particular composition. The main features of the material to be used is that it should be able to withstand stress which it might see in the reactor. Also, preferably, it should be able to support a catalyst or act as a catalyst. Suitable materials include silica-alumina-magnesia, (cordierite), alumina oxide, lithium-alumina silicates, magnesium alumina silicates and the like.

As was mentioned before, preferably honeycomb structure 12 is made catalytically active to help further initiate a cold start reaction. In most cases the honeycomb structure must be treated to obtain catalytic activity. The catalyst used for the reaction will have to be one to catalyze that particular reaction. It may be any one of the well known catalyst materials used; as for example, suitable oxidation catalysts including the oxides of the metals of Groups I, V, VII and VIII of the Periodic Table, particularly chromium, copper, nickel, and platinum. The application of this catalyst to the honeycomb support can be affected in many ways, for example by immersing the structure in an aqueous solution of a water-soluble inorganic salt or salt of the particular metal or metals, with agitation. The metal oxide can be reduced, if the metal from catalyst is desired, by contacting the same with a reducing gas such as hydrogen at elevated temperatures. To provide more surface area, the skeletal structure or honeycomb may be first coated with a surface-extending refractory oxide, such as alumina, silica-alumina, zirconia silica-boria, silica-boria, and the like.

The honeycomb material, of course, must be thick enough to be able to support itself in the particular diameter or width utilized. We have found that when utilized as a catalyst the most rapid conversion takes place in the first ¼ in. to 1 in. of material under typical automotive conditions. This is because typically entry flow into a catalyst zone such as a skeletal structure illustrated in FIG. 3 results in an initial square velocity profile normal to the main flow direction. The square profile is converted to a parabolic one after a characteristic entry length for zones in which laminar flow is the normal fluid condition. The establishment of a parabolic velocity profile results in a stopped or slowly moving fluid in the immediate neighborhood of the catalyst surface contact of the reactant with the catalyst is greatly enhanced in this region prior to establishment of a concentration gradient with respect to the core of the fluid flow. The characteristic entry length is greater for entrant turbulent flow than for entrant laminar flow. Thus, the optimum design of a catalytically active zone limits the zone length to the characteristic entry length. In other words for a particular conversion operation in a honeycomb material of a 2 inch thickness the first ½ in. may have conversion efficiency of 70 percent while the last 1 ½ in. will see conversion efficiency of perhaps 30 percent. It is seen that one can use relatively thin honeycomb sections to obtain excellent conversion.

It is noted that the honeycomb material 12 is spaced from the housing and in the space there is provided packing 15 to take up any relative expansion of the housing and the honeycomb material and also to provide for greater dimensional tolerance in manufacturing procedures. It is also noted that the flanged portions 8 of the end closure means 4 overlaps the peripheral edge of the honeycomb material. This has the effect of blocking flow through the perimeter openings in the honeycomb which thus establishes a layer of insulation to protect the outer housing from extreme heat.

Figure 1:
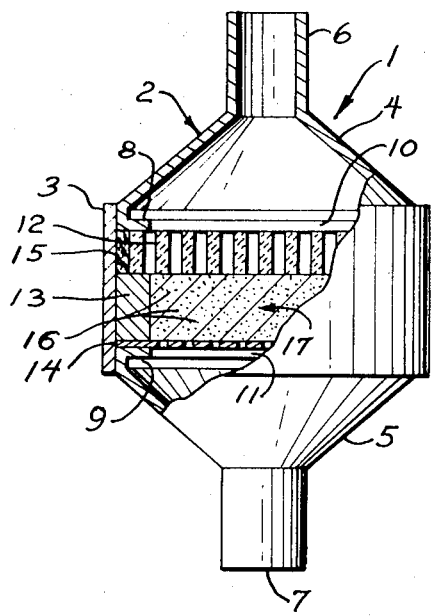
FIG. 1 of the drawing is an elevational sectional view of a preferred embodiment of the converter of this invention.

There is located within catalyst retaining section 17 a subdivided catalyst material 16 which may take the form of spheres, cylinders, pellets, or other regular or irregular shapes. Typically, such catalyst material is comprised of a metal or metal oxide or a combination thereof in combination with an organic refractory support material, such as alumina, silica-alumina-zirconia, silica-thoria, silica-boria, and the like. Of course, the particular catalyst will depend upon the reaction which is to take place within the reactor. The size of the particular particles to be utilized in the catalyst retaining section will by necessity have to be larger than the openings in the honeycomb 12 or support screen 14. If the size of the subdivided catalyst is predetermined, then the sizing of the openings in the honeycomb and the screen 14 will be dictated. As mentioned before, there is provided an annular ceramic ring 13 to support and space the sides of the retaining section 17. Of course the size of the retaining section will have to be designed to be sufficient to convert the fluid to the desired components. Thus, there is provided in the embodiment of FIG. 1 a converter which utilizes the advantages of low pressure drops in the honeycomb material along with high catalyst activity of subdivided particulate material.

Preferably, the fluid is introduced through inlet 6 into the converter and is passed through the catalytically active skeletal material zone 12 which have a plurality of flow paths in the direction of flow. Immediately after passing through the skeletal material zone, fluid is passed through the catalytically active subdivided material zone and is finally withdrawn from such zone and passed out of the converter. This configuration has the characteristic of fast light off in a cold start situation. If a steel screen were utilized as the inlet side of the retaining section as is typically done in the art, it would in effect cool the gases coming into the converter. With the use of a catalytically active honeycomb support which is the preferred embodiment of this invention the relatively cool gases from an engine start off are converted initially in the honeycomb material and because of the exothermic reaction taking place will actually heat subdivided catalysts downstream of the honeycomb. Because the honeycomb material is preferably used as a catalyst support, it is possible to also develop a converter having a lower overall pressure drop than would be possible with a converter of only subdivided material. Of course the pressure drop would most likely be more than if only honeycomb material would be utilized; however, it is noted that generally honeycomb material cannot be made as active as subdivided or spherical material. It will be seen that in the embodiment of FIG. 1 the screen 14 may also be replaced with a honeycomb material activated with a catalyst to provide for further activity. A modification of this is shown in FIG. 2 of the drawing where a converter having two retaining sections of subdivided catalyst material is shown.

Figure 2:
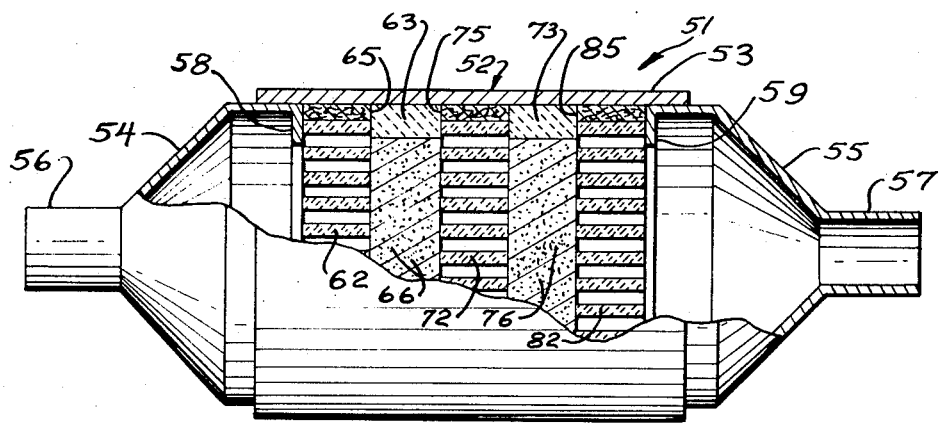
FIG. 2 of the drawing is a cross-sectional elevational view of another embodiment of the converter of this invention having two catalyst retaining sections.

Referring now to FIG. 2 of the drawing in more detail there is shown an elevational view of a catalytic reactor which may be used for the conversion of exhaust gases. Converter 51 is comprised of an outer housing 52 having a central tubular section 53 and two end closure sections 54 and 55. Again, because of ease of fabrication, the preferred cross-section of the housing 52 is circular; however, it should not be limiting upon the present invention. Reactor 51 is further comprised of inlet 56 and outlet 57 for introducing and discharging the gases and fluid therein. Of course, both inlet and outlet means communicate through the housing 52 and to the interior thereof. There are provided flanged portions 58 and 59 on the end closures 54 and 55 respectively to establish support for the catalyst retaining section disposed within the housing. Flanged portions 58 and 59 also serve to block the flow through the peripheral areas of the honeycolmb material described hereinafter. To establish the two retaining sections there is provided three sections of honeycomb or skeletal material 62, 72, and 82 respectively, which may be of similar configuration as described heretofore. The honeycomb material is undersized for ease in fabrication and to permit the use of an expansion packing 65, 75 and 85 between the housing and the honeycomb material. To space the honeycomb material there is provided ceramic spacer rings 63 and 73 which also act as barrier means for the downstream peripheral edge of the honeycomb material. Within the space defined by the honeycomb material there is provided subdivided catalyst material 66 and 76 which may also be of the type previously described as related to FIG. 1 of the drawing. The embodiment of FIG. 2 of the drawing has all the advantages of the embodiment of FIG. 1 and has the further advantage in that the fluid is passed alternately between honeycomb sections, spheres or subdivided catalyst material, honeycomb catalyst material, subdivided honeycomb material, and honeycomb catalytic material.

It is recalled that the flow through honeycomb material used was such that the square reactant concentration profile goes parabolic after a short distance in the material. Thus by using optimum lengths of honeycomb material it was seen that the square reactant concentration profile can be maintained through substantially the entire length of the first honeycomb material. After the fluid leaves the first honeycomb material it is subjected to a mass of subdivided catalyst particles wherein the fluid is redistributed before the next honeycmb material where it enters with a substantially square reactant concentration profile. This is repeated through the second bed of subdivided catalyst material.

From the foregoing description it is seen that the present invention provides for the method and means of catalytically converting a fluid which comprises the steps of alternately introducing the fluid into an active zone of honeycomb or skeletal material and immediately after withdrawing from such zone, passing said fluid through a zone of subdivided catalyst material. It should be understood that many variances of structure configurations illustrated in the drawing are possible without parting from the essential features of this invention. The present invention is not intended to be limited to any particular description or exemplary arrangement disclosed merely to describe the invention more fully.

We claim as our invention:

1. A catalytic converter having fast light-off properties for converting exhaust gases from internal combustion engines comprising in combination:
   a. an outer housing
   b. inlet means connected to said housing for introducing said exhaust gases therein;
   c. outlet means connected to said housing for withdrawing converted gases therefrom;
   d. a catalyst retaining section supported in said housing and having a perforate inlet wall communicating with said inlet means and a perforate outlet wall communicating with said outlet means;
   e. said inlet wall being comprised of a catalytically active skeletal refractory structure having a plurality of flow paths extending therethrough in the direction of flow; and,
   f. subdivided catalyst in said retaining section, said inlet and outlet walls defining the axial extent of said catalyst retaining section.

2. The converter of Claim 1 further characterized in that said outlet wall is comprised of a catalytically active skeletal structure having a plurality of flow paths extending therethrough in the direction of flow.

3. The converter of Claim 1 further characterized in that there is provided a plurality of catalyst retaining sections spaced by common perforate walls, each common perforate wall comprised of a catalytically active skeletal structure having a plurality of flow paths extending therethrough in the direction of flow.

4. The converter of Claim 1 further characterized in that there is provided an annular barrier means upstream of the inlet perforate wall of said catalyst retaining section for preventing fluid flow through the perimeter openings of said perforate wall.

* * * * *